US008666598B2

(12) United States Patent
Lemay et al.

(10) Patent No.: US 8,666,598 B2
(45) Date of Patent: *Mar. 4, 2014

(54) METHOD OF CONTROLLING THE YAWING MOVEMENT OF AN AIRCRAFT RUNNING ALONG THE GROUND

(75) Inventors: David Lemay, Chaville (FR); David Frank, Paris (FR); Michel Basset, Heimsbrunn (FR); Yann Chamaillard, Le Bardon (FR)

(73) Assignee: Messier-Bugatti-Dowty, Velizy Villacoublay (FR)

( * ) Notice: Subject to any disclaimer, the term of this patent is extended or adjusted under 35 U.S.C. 154(b) by 58 days.

This patent is subject to a terminal disclaimer.

(21) Appl. No.: 13/211,659

(22) Filed: Aug. 17, 2011

(65) Prior Publication Data
US 2012/0046834 A1 Feb. 23, 2012

(30) Foreign Application Priority Data

Aug. 18, 2010 (FR) ...................................... 10 56655

(51) Int. Cl.
*G05D 1/00* (2006.01)
(52) U.S. Cl.
USPC ..... 701/41; 701/3; 701/16; 463/63; 280/5.51; 280/777; 244/110 A; 303/7; 303/10; 180/14.6; 180/422; 70/186
(58) Field of Classification Search
USPC .................. 701/3, 16; 463/63; 280/5.51, 777; 244/110 A; 303/7, 10; 180/14.6, 422; 70/186

See application file for complete search history.

(56) References Cited

U.S. PATENT DOCUMENTS

| 3,774,340 | A | * | 11/1973 | Barlow et al. | 463/63 |
|---|---|---|---|---|---|
| 4,482,961 | A | * | 11/1984 | Kilner et al. | 701/16 |
| 4,621,833 | A | * | 11/1986 | Soltis | 280/5.51 |
| 5,906,120 | A | * | 5/1999 | Thacker et al. | 70/186 |
| 5,938,239 | A | * | 8/1999 | Baumann et al. | 280/777 |
| 7,731,302 | B2 | * | 6/2010 | Tandy et al. | 303/7 |
| 7,798,263 | B2 | * | 9/2010 | Tandy et al. | 180/14.6 |
| 2002/0180258 | A1 | * | 12/2002 | Davison et al. | 303/10 |
| 2004/0060765 | A1 | * | 4/2004 | Mattson et al. | 180/422 |
| 2006/0186267 | A1 | * | 8/2006 | Steiner et al. | 244/110 A |
| 2009/0150010 | A1 | * | 6/2009 | Villaume et al. | 701/3 |

OTHER PUBLICATIONS

Duprez, Jean, "Chapitre 4: Etude d'une loi de pilotage lateral de l'avion au sol," Automatisation du pilotage au sol pour la navigation portuaire, Mar. 6, 2007, pp. 1-51.
Duprez, J., et al., "Control of the Aircraft-on-Ground Lateral Motion During Low Speed Roll and Manoeuvers," Aerospace Conference Proceedings, IEEE, Mar. 6, 2004, pp. 2656-2666, vol. 4.

* cited by examiner

*Primary Examiner* — James Trammell
*Assistant Examiner* — Sanjeev Malhotra
(74) *Attorney, Agent, or Firm* — Sughrue Mion, PLLC

(57) ABSTRACT

A method of controlling a yawing movement of an aircraft running along the ground, the aircraft comprising at least one first landing gear with a steerable bottom part bearing wheels. The method comprises the steps of (1) on the basis of a yaw rate setpoint $\dot{\phi}_c$, determining a wheel-steering prepositioning angle $\theta_p$; and (2) using closed-loop control which as its input has the yaw rate setpoint and which generates a command to steer the bottom part in order to steer it through a steering angle $\theta_c$ equal to the sum of this prepositioning angle $\theta_p$ and of an angle $\theta_z$ which is determined taking account of an error between the yaw rate setpoint $\dot{\phi}_c$ and the measured yaw rate $\dot{\phi}_m$ when the steerable bottom part is steered by the steering angle $\theta_c$.

4 Claims, 2 Drawing Sheets

METHOD OF CONTROLLING THE YAWING MOVEMENT OF AN AIRCRAFT RUNNING ALONG THE GROUND

The invention relates to a method of controlling the yawing movement of an aircraft running along the ground.

It will be recalled that an aircraft comprises a set of landing gear, which comprises several landing gears, with a view to providing an interface between the aircraft and the ground.

BACKGROUND OF THE INVENTION

Usually, a pilot controls a yawing movement of an aircraft running along the ground by acting on controls (the pedals of a rudder bar, a control wheel, etc.). In the case of an aircraft that has at least landing gear with a steerable bottom part bearing wheels, the controls act directly, through a controller that is dependent on the speed of the aircraft, on the steerable bottom part.

The thesis entitled "Automatisation du pilotage au sol pour la navigation portuaire [Automation of ground steering for port navigation]", written by Mr. Jean DUPREZ for Airbus France—LAAS in 2004 (accessible through the on-line thesis website http://tel.archives-ouvertes.fr/) discloses how to modify the controller in order to provide the pilot with greater assistance in controlling the yawing movement. The thesis thus describes the following method:

on the basis of a command generated by the controls, determining a prepositioning angle through which to steer the wheels of the bottom part of the landing gear;

using closed-loop control which as its input has the prepositioning angle and which generates a correction thereof;

steering the bottom part through a steering angle equal to the prepositioning angle from which the correction has been subtracted.

OBJECT OF THE INVENTION

The object of the invention is to propose a method of controlling a yawing movement of an aircraft running along the ground, in which the steering angle for the bottom part undergoes a different type of closed-loop control.

BRIEF DESCRIPTION OF THE INVENTION

With a view to achieving this objective, there is proposed a method of controlling a yawing movement of an aircraft running along the ground, the aircraft comprising at least one first landing gear with a steerable bottom part bearing wheels.

According to the invention, the method comprises the steps of:

on the basis of a yaw rate setpoint, determining a wheel-steering prepositioning angle;

using closed-loop control which as its input has the yaw rate setpoint and which generates a command to steer the bottom part in order to steer it through a steering angle equal to the sum of this prepositioning angle and of an angle which is determined taking account of an error between the yaw rate setpoint and the measured yaw rate when the steerable bottom part is steered by the steering angle.

Thus the bottom part is steered by controlling the steering angle about a bottom part prepositioning position.

According to one preferred embodiment of the invention, the method is applied to an aircraft further comprising at least two main landing gears positioned respectively one on the left and one on the right of the fuselage and the wheel's of which are associated with torque application members, the method comprising the step of generating, for the attention of the torque application members of the left and right main landing gears, two acceleration setpoints so that the members thus stimulated generate, on the aircraft, a yaw moment that complements the yaw moment generated by the first landing gear, so that the total yaw moment generated on the aircraft allows the aircraft to comply with the yaw rate setpoint.

The torque application members are, for example, friction brakes and/or self-propelled movement devices, a self-propelled movement device comprising a motor.

The method according to the invention thus makes it possible simultaneously, by distributing the yaw moment, to control both the steering of the bottom part of the first landing gear and a rotational speed differential that is the differential in rotational speeds of the main landing gears. The pilot then no longer has to worry about how the commands are split to act on the steering of the bottom part and on the acceleration of the wheels of the main landing gears.

BRIEF DESCRIPTION OF THE DRAWINGS

The invention will be better understood in the light of the following description of one particular nonlimiting embodiment of the invention, with reference to the figures of the attached drawings in which.

DETAILED DESCRIPTION OF THE INVENTION

Figure 1:
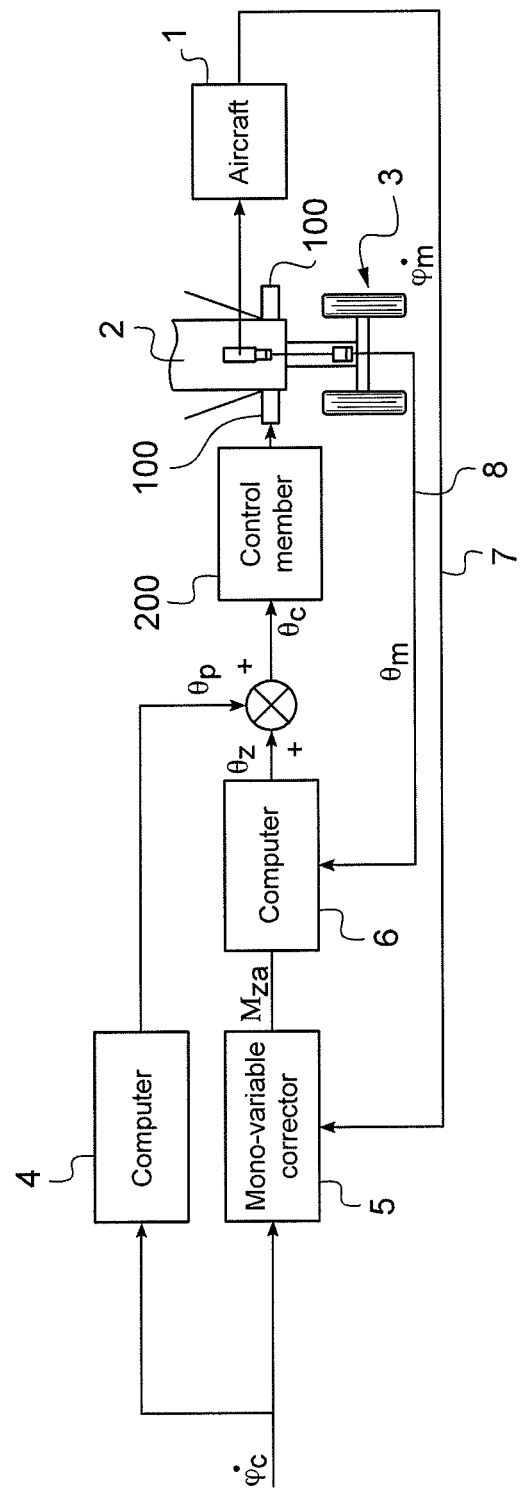
FIG. 1 is a block diagram of how the method according to the invention works.

With reference to FIG. 1, the method according to the invention is detailed in its application to an aircraft 1 comprising at least one first landing gear with a steerable bottom part bearing wheels. The aircraft 1 here comprises an auxiliary landing gear 2 which is situated in the forward part of the fuselage and which comprises a bottom part 3 that can be steered by actuators 100. A control member 200 controls the actuators 100 of the bottom part 3.

A pilot wishing to cause the aircraft 1 running along the ground to effect a yawing movement then acts on various controls (such as the pedals of a rudder bar or a control wheel) to generate a yaw rate setpoint $\dot{\phi}_c$.

On the basis of the yaw rate setpoint $\dot{\phi}_c$, a computer 4 determines a prepositioning angle $\theta_p$ by which to steer the wheels of the bottom part 3 using a calculation which in this instance is identical to the one explained in the aforementioned thesis.

At the same time, on the basis of the yaw rate setpoint $\dot{\phi}_c$, a mono-variable corrector 5 determines a yaw moment setpoint $M_{za}$ to be generated in the aircraft 1 by the auxiliary landing gear 2 so that the yaw moment $M_{za}$ generated will allow the aircraft 1 to comply with the yaw rate setpoint $\dot{\phi}_c$. Next, a second computer 6 converts the yaw moment setpoint $M_{za}$ into an angle setpoint $\theta_z$. A steering angle setpoint $\theta_c$ is then generated for the attention of the control member 200, the steering angle $\theta_c$ being equal to the sum of the prepositioning angle $\theta_p$ and of the angle $\theta_z$ deduced from the yaw moment setpoint $M_{za}$. On the basis of the steering setpoint $\theta_c$, the control member 200 controls the actuators 100 to make these steer the bottom part 3 through the steering angle $\theta_c$.

According to the invention, at any moment in the yawing movement, the yaw rate $\dot{\phi}_m$ of the aircraft 1 is measured. On the basis of the measured yaw rate $\dot{\phi}_m$ and of the yaw rate setpoint $\dot{\phi}_c$, the mono-variable corrector 5 determines the yaw moment setpoint $M_{za}$ taking account of an error between the yaw rate setpoint $\dot{\phi}_c$ and the measured yaw rate $\dot{\phi}_m$ when the steerable bottom part is steered through the steering angle $\theta_c$. Thus, the angle setpoint $\theta_z$, derived directly from the yaw moment setpoint $M_{za}$, is also determined taking account of an error between the yaw rate setpoint $\dot{\phi}_c$ and the measured yaw rate $\dot{\phi}_m$.

Thanks to the prepositioning, the yaw rate of the aircraft 1 quickly converges on the yaw rate setpoint $\dot{\phi}_c$. Next, by controlling 7 the steering angle $\theta_c$ about the prepositioning angle, the yaw rate of the aircraft 1 is made to comply with the yaw rate setpoint $\dot{\phi}_c$, at least under the normal conditions of steering operation of the bottom part.

Here, at any moment in the yawing movement, the steering angle $\theta_m$ is measured. On the basis of the measured steering angle $\theta_m$, the second computer 6 determines the angle setpoint $\theta_z$ derived directly from the yaw moment setpoint $M_{za}$, taking account of an error between the steering angle setpoint $\theta_z$ and the measured steering angle $\theta_m$. Using control 8 of the steering angle $\theta_z$, a steering angle that complies with the steering angle setpoint $\theta_c$ is obtained without the first control 7 directly incorporating the error between the steering angle setpoint $\theta_c$ and the measured steering angle $\theta_m$.

Figure 2:
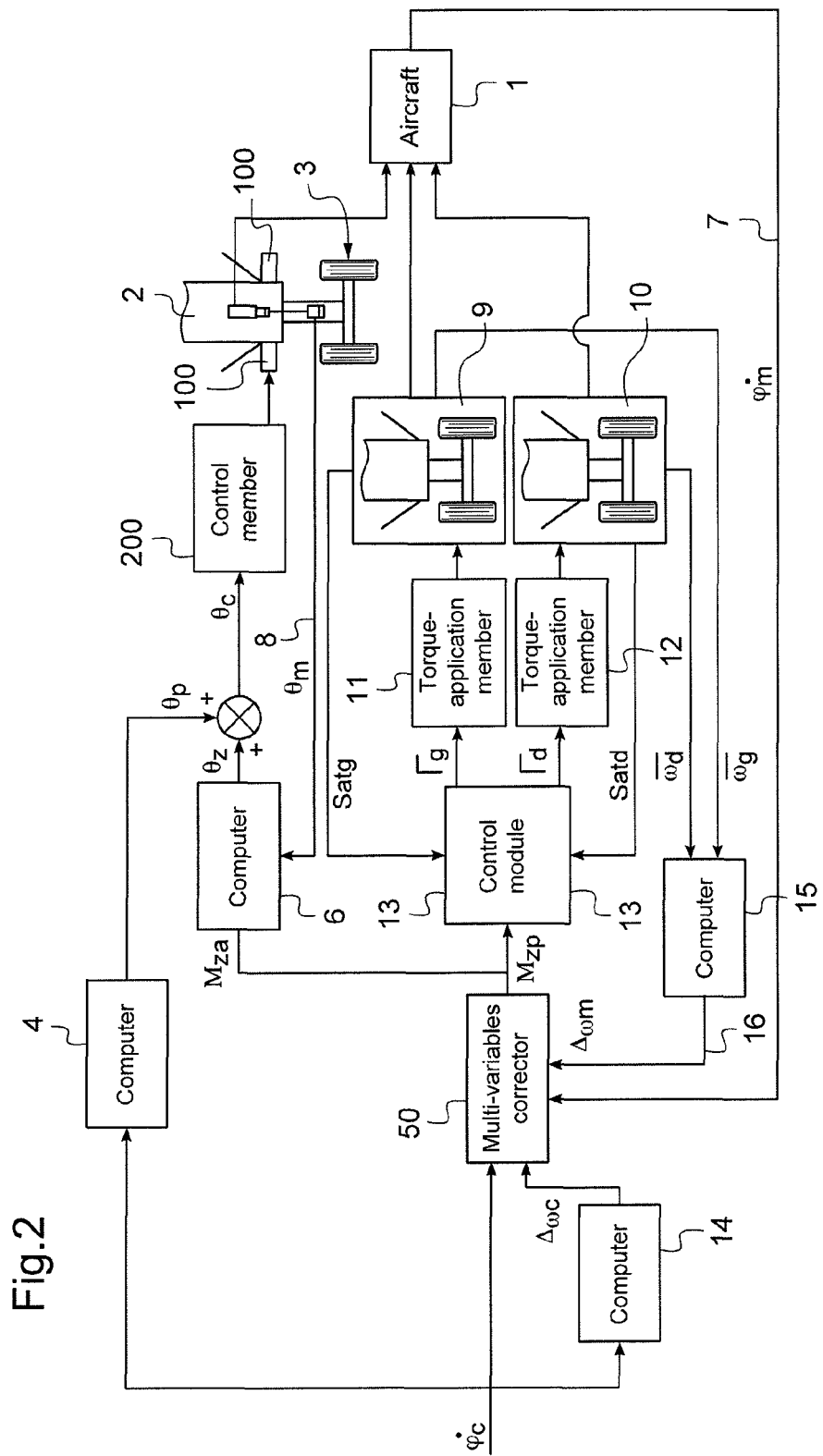
FIG. 2 is a block diagram of how the method according to the invention works in a preferred embodiment.

With reference to FIG. 2, the aircraft 1 further comprises at least two main landing gears 9,10 positioned respectively on the left and on the right at the rear of the fuselage and the wheels of which are associated with torque application members 11,12, respectively. By applying a torque to the aircraft 1, said members 11,12 are able to create a rotational speed differential which is the differential between the rotational speeds of the wheels of the left main landing gear 9 and of the right main landing gear 10. According to a preferred embodiment, the method of the invention incorporates the torque application members 11,12 so as simultaneously to control the steering of the bottom part 3 of the landing gear 1 and a rotational speed differential that is the differential between the rotational speeds of the main landing gears 9,10.

To do this, on the basis of the yaw rate setpoint $\dot{\phi}_c$, a multi-variables corrector 50 then simultaneously determines the yaw moment setpoint $M_{za}$ to be generated on the aircraft 1 by the auxiliary landing gear 2 and an additional yaw moment setpoint $M_{zp}$ to be generated on the aircraft 1 by the torque application members 11,12 so that the overall yaw moment generated by the auxiliary landing gear 2 and by the torque application members 11,12, will allow the aircraft 1 to comply with the yaw rate setpoint $\dot{\phi}_c$.

In a way known per se, the torque application members 11,12 are controlled by a control module 13. On the basis of the additional yaw moment setpoint $M_{zp}$, the control module 13 generates two acceleration setpoints $\Gamma_g$, $\Gamma_d$ for the attention of the torque application members 11,12. Under certain circumstances (wet runway, defective acceleration means, etc.) it may happen that one or more of said members is unable to generate anything more than a limited acceleration, thus preventing the additional yaw moment setpoint $M_{zp}$ from being achieved. In such an instance, a saturation signal $Sat_g$, $Sat_d$ is sent by the left 9 or right 10 main landing gear concerned to the control module 13 which then takes this saturation into consideration when generating acceleration setpoints $\Gamma_g$, $\Gamma_d$ that will allow best convergence toward the required additional yaw moment setpoint $M_{zp}$.

According to the invention, on the basis of the yaw rate measurement $\dot{\phi}_m$ and of the yaw rate setpoint $\dot{\phi}_c$, the multi-variables corrector 50 simultaneously determines the yaw moment setpoint $M_{za}$ to be generated by the auxiliary landing gear 2 and the additional yaw moment setpoint $M_{zp}$ to be generated by the torque application members 11,12 so that the total yaw moment will allow the aircraft 1 to comply with the yaw rate setpoint $\dot{\phi}_c$. To do that, the multi-variables corrector 50 takes account of an error between the yaw rate setpoint $\dot{\phi}_c$ and the measured yaw rate $\dot{\phi}_m$ when the steerable bottom part 3 is steered through the steering angle $\theta_c$ and the torque application members 11,12, are driven in rotation at an acceleration $\Gamma_g$, $\Gamma_d$. Control in acceleration of the torque application members 11,12 is also obtained using the first control 7.

In this instance, a third computer 14 converts the yaw rate setpoint $\dot{\phi}_c$ into a rotational speed differential setpoint $\Delta\omega_c$, said setpoint then being forwarded to the multi-variables corrector 50. Furthermore, at any moment in the yawing movement, the mean rotational speeds $\overline{\omega}_g$, $\overline{\omega}_d$ of the wheels of the left and right main landing gears 9,10, respectively, are measured. On the basis of the measured mean rotational speeds $\overline{\omega}_g$, $\overline{\omega}_d$, a fourth computer 15 determines a measured rotational speed differential $\Delta\omega_m$ which is then forwarded to the multi-variables corrector 50. On the basis of the rotational speed differential setpoint $\Delta\omega_c$ and of the measured rotational speed differential $\Delta\omega_m$, the multi-variables corrector 50 then determines the additional yaw moment setpoint $M_{zp}$ to be generated by the torque application members 11,12 taking account of an error between the rotational speed differential setpoint $\Delta\omega_c$ and the measured rotational speed differential $\Delta\omega_m$. Using a third control 16, accelerations of the wheels of the left and right main landing gears 9,10 that comply with the acceleration setpoints $\Gamma_g$, $\Gamma_d$ are achieved without the first control 7 directly incorporating the error between the rotational speed differential setpoint $\Delta\omega_c$ and the measured rotational speed differential $\Delta\omega_m$.

Of course, the invention is not restricted to the embodiment described and implementation variations can be made thereto without departing from the scope of the invention as defined by the claims.

In particular, the use here of the expression acceleration of the wheels of the main landing gears 9,10, covers both positive acceleration of the wheels and negative acceleration of the wheels, negative acceleration also being known as deceleration.

Although it has been mentioned that the aircraft 1 comprises an auxiliary landing gear at the front 2 and two main landing gears at the rear 9,10, the landing gears could of course be configured in any other way. Further, the aircraft 1 could comprise a quite different number of landing gears and each landing gear could comprise a quite different number of wheels.

The invention claimed is:

1. A method of controlling a yawing movement of an aircraft having a fuselage and running along the ground, the aircraft comprising at least one first landing gear with a steerable bottom part bearing wheels, the method being characterized in that it comprises the steps of:

on the basis of a yaw rate, determining a wheel-steering prepositioning angle $\theta_p$;

using closed-loop control, which as its input has the yaw rate and which generates a command to steer the steerable bottom part in order to steer the steerable bottom part through a required steering angle $\theta_c$ equal to the sum of said prepositioning angle $\theta_p$ and an angle $\theta_z$, which is determined by taking account of an error, between the yaw rate and a measured yaw rate $\dot{\phi}_m$, when the steerable bottom part is steered by the required steering angle $\theta_c$;

the method applied to an aircraft further comprising at least two main landing gears with wheels and being positioned, respectively, a left main landing gear on a left side of the fuselage and a right main landing gear on a right side of the fuselage and the wheels each of said left and fight main landing gears being associated with torque application members, the method further comprising the step of generating, for attention of the torque application members of the left and right main landing gears, two acceleration setpoints, a left setpoint $\acute{\Gamma}_g$ and a right setpoint $\acute{\Gamma}_d$, so that the torque application members thus stimulated generate, on the aircraft, a yaw moment $M_{zp}$ that complements the yaw moment $M_{za}$ generated by the first landing gear, so that the total yaw moment generated on the aircraft allows the aircraft to comply with the yaw setpoint $\phi_c$; and the method in which the acceleration setpoints $\acute{\Gamma}_g$, $\acute{\Gamma}_d$ are generated taking account of saturations in the accelerations on the right side ($Sat_g$) and on the left side ($Sat_d$) of the wheels of the right and left main landing gears, respectively.

2. The method according to claim 1, in which the required steering angle $\theta$, is equal to a sum of the prepositioning angle $\theta_p$ and the angle $\theta_z$, which is further determined taking account of an error between the required steering angle $\theta_c$ and a measured steering angle $\theta_m$.

3. The method according to claim 1, in which the acceleration setpoints $\acute{\Gamma}_g$, $\acute{\Gamma}_d$ are generated taking account of an error between the yaw rate setpoint $\phi_c$ and the measured yaw rate $\phi_m$.

4. The method according to claim 3, in which the acceleration setpoints $\Gamma_g$, $\Gamma_d$ are generated taking further account of an error between a rotation differential setpoint $\Delta\omega_c$ that is the differential in rotation between the wheels of the left and right main landing gears and a measured rotation differential $\Delta\omega_m$ that is the differential in rotation between the wheels of the right and left main landing gears.

\* \* \* \* \*